3,578,609
ION EXCHANGE RESIN CONTAINING
ZERO-VALENT METAL
Werner O. Haag, Trenton, and Darrell Duayne Whitehurst, Raritan, N.J., assignors to Mobil Oil Corporation
No Drawing. Filed Oct. 2, 1967, Ser. No. 672,007
Int. Cl. C07c 5/02
U.S. Cl. 252—430                          4 Claims

ABSTRACT OF THE DISCLOSURE

This specification discloses an ion exchange resin containing zero-valent metal. In the preparation thereof, an ion exchange resin is contacted with a reducing agent to fix the reducing agent in the resin. Thereafter, the resin is contacted with a soluble metal compound, the metal being from Groups VIII, I–B, II–B, III–B, IV–B, V–B, VI–B, and VII–B of the Periodic Table. The metal of the compound is thereby reduced to the zero-valent state in situ in the resin. The resulting product may be employed as a catalyst.

CROSS REFERENCES TO RELATED APPLICATIONS

Use of the catalysts in certain reactions is disclosed in our copending application Ser. No. 672,008 filed concurrently herewith entitled "Catalytic Polystep Reactions."

BACKGROUND OF THE INVENTION (1) The field of the invention comprises heterogeneous catalysis with metals.

(2) The increasing demand for specialized chemicals by the plastics, chemical, automotive and other industries has created a need for the development of very selective catalysts. With catalysis by metals, the selectivity for chemical conversions is influenced by the support, metal concentration thereon, degree of dispersion of the metal (crystallite size), and the addition of specific poisons. By the use of ion exchange resins as supports, as disclosed herein, the invention provides a means of controlling these variables much more easily than has been previously possible. Unusual selectivity for hydrogenations has been demonstrated.

SUMMARY OF THE INVENTION

The invention enables metals, particularly of the platinum series, but also including other metals of Group VIII, and metals of Groups I–B, II–B, III–B, IV–B, V–B, VI–B, and VII–B of the Periodic System, to continue to be used as catalysts but provides them in an improved form by incorporating the same on and/or in insoluble ion exchange resins. The resulting catalyst material is insoluble in conventional liquids and functions as a heterogeneous catalyst.

DESCRIPTION OF THE SPECIFIC EMBODIMENTS

Generally speaking, in order to prepare the supported metal catalysts, an ion exchange resin in particulate form is treated with a reducing agent so as to fix the agent either chemically or physically to the resin without destroying the reducing properties of the agent. The treated resin is then contacted with a suitable soluble metal compound, which is reducible, and which may be either an ionic or a neutral compound, and the compound is reduced on contact with the reducing agent and deposits zero-valent metal on the resin at or near the site formerly occupied by the reducing agent.

For example, by contacting a porous sulfonated ion exchange resin with a solution of hydrazine in a non-ionizing solvent, or with hydrazine vapor, the hydrazine is adsorbed and held as hydrazinium ions near the exterior boundary of the resin particles. On contacting these treated particles with a solution of a palladium compound, palladium deposits on the outer surface of the particles in the form of a thin shell.

On the other hand, if the hydrazine-treated resin is held in aqueous suspension for a prolonged period of time, a redistribution of the hydrazine throughout the resin particles is obtained, and this redistribution is accelerated by applying heat, as refluxing. The hydrazine-loaded resin can be used to reduce solutions of metal compounds to produce catalysts with a variety of metal dispersions, ranging from a catalyst having metal dispersed in the form of a shell (thicker than in the preceding example) adjacent the exterior boundary of the particles to a catalyst in which metal is dispersed uniformly throughout the particles. Factors in obtaining various dispersions are the rates of diffusion of the metal compounds into the porous particles and the rates of reduction of the metal compounds by the hydrazinium ions which are fixed in the resin. Metal compounds which diffuse relatively slowly into the particles but which are relatively rapidly reduced will deposit metal almost exclusively on or adjacent the outer surface of the particles; while less reactive and more diffusable metal compounds lead to more uniform dispersions of metal in the particles.

The porous ion exchange resin which is used to prepare the catalyst material contains functional groups, i.e. acid groups in the case of a cation exchange resin and basic groups in the case of an anion exchange resin, and these groups of course are chemically bonded to the resin or resin matrix. Cation exchange resins contain such acidic functional groups as sulfonic acid, phenolsulfonic acid, phenol, phosphonic acid, carboxylic acid, etc. Anion exchange resins contain such basic groups as primary, secondary, tertiary amine, or quaternary ammonium groups, and these may be aliphatic, aromatic, heterocyclic, or cycloalkane amines; or mixtures thereof, or diamines, triamines, and alkanolamines; or amines like alpha, alpha'-dipyridyl; or the resins may contain basic groups like guanidine, dicyandiamidine, nitrile, cyanate, isocyanate, thiocyanate, isothiocyanate, isocyanide, etc., as well as other organic nitrogen-containing groups. These ion exchange resins are generally made by subjecting to appropriate chemical treatment a desired copolymer base material or matrix; for example, a styrene-divinylbenzene copolymer may be converted to a sulfonic acid cation exchange resin by sulfonation; or the resins may be made by reacting all ingredients together, thus a cation exchange resin of phenolic type can be prepared by reacting a phenol, an aldehyde, and a sulfonic acid. Illustrative ion exchange resins for making the catalysts include sulfonated copolymers of styrene and a divinyl-aromatic; phenolic methylene sulfonic acid resins; sulfonated coal; styrene-divinylbenzene copolymer containing dimethylaminomethyl groups; polystyrene sulfonic acid resins; cross-linked polyvinyl pyridine; a copolymerized mixture of phenol, formaldehyde, and triethylenetetramine; hydroylzed styrene-divinylbenzene copolymers incorporating maleic anhydride; polyacrylic acid resin; chloromethylated styrene-divinylbenzene copolymer treated with trimethylamine; melamine - formaldehyde - guanidine polymers; urea-formaldehyde-triethanolamine resins; polyalkylene-polyamine-formaldehyde resins, etc. Ion exchange celluloses are suitable. Preferably the resin is in particulate form, particularly bead form, and may have any desired particle size. The resin is porous under the reaction conditions employed. Thus, the resin may be intrinsically porous or may have induced porosity, such as achieved, for example, by the swelling of a nonporous metal compound containing resin in a reaction solvent.

The reducing agent may be any suitable compound capable of being fixed, either chemically or physically, on and/or in the resin without destruction of its reducing power. For example, it may be hydrazine, a substituted hydrazine, hydroxylamine, a mercurous compound, or a cuprous compound, all of which are capable of being chemically bonded to cation exchange resins while maintaining their reducing properties. Or it may be a formate, hydrosulfite, or hypophosphite, e.g. sodium or potassium hypophosphite, which may chemically bond to an anion exchange resin while maintaining their reducing properties. Stannous compounds like stannous chloride also form chemical compounds with ion exchange resins without losing reducing power. Other agents include hydroquinone, ferrous oxalate, p-phenylenediamine, p-aminophenol, catechol, pyrogallol, and the like.

The metal compound may be any suitable ionic or neutral compound whose metal moiety is one selected from the metals of Groups VIII, I–B, II–B, III–B, IV–B, V–B, VI–B, and VII–B of the Periodic System. For example, ionic compounds may include copper sulfate, ferric chloride, nickel acetate, silver nitrate, gold chloride, mercuric acetate, cadmium nitrate, sodium tetrachloropalladite (II), azidopentaamminecobalt (III), sulfate, hexaaquochromium (III), chloride, potassium tetranitritoplatinate (II), potassium hexaiodo rhenate (IV), bis cyclopentadienyl iridium (III) chloride, and cesium aquoethyltrichlororhodiate (III). Illustrative neutral compounds are bis(benzonitrile) palladium dichloride, bis(hydrogen sulfito) tetraammineruthenium, cis-dichlorobis(triethylphosphine)platinum (II), tetra(pyridine)platinum (II) tetrachloroplatinate (II), cyclooctadieneplatinum dibromide, ruthenocene, $\pi$-allyl nickel bromide, tetraethyl lead and bisbenzene chromium.

It will be understood that the choice of metal compound may influence the choice of the reducing agent. For example, platinum compounds work well with reducing agents like hydrazine and formates. With iron compounds it is preferred not to use an agent like hydroxylamine; and with iron, cobalt, and nickel compounds it is preferred not to use formates. Hydrazine is generally useful for most metal compounds. A simple test is sufficient to indicate the choice of reducing agent with any particular metal compound.

To prepare the catalyst material, the desired ion exchange resin is treated with the reducing agent at a temperature which is generally room temperature but which may range to about 100° C. or to refluxing. The agent may be in vaporous or liquefied form; in the latter case the agent may either be normally liquid or, if a solid, in solution in a suitable solvent. The solvent may be an ionizing compound like water and various low molecular weight alcohols, or a non-ionizing compound like a hydrocarbon, chlorinated hydrocarbon, ether, etc. The time of contact is variable, depending on the type of metal deposition desired in the resin particles, i.e. shells of varying depth or a uniform deposition throughout the particles. Generally, to obtain shell deposition, the contact time is of the order of minutes, while for complete uniform deposition the time is of the order of several hours.

After treatment with the reducing agent, the treated resin may be washed, and if desired may be stored until the time of use of the catalyst material, even for a period of weeks or months, at which time it is mixed with a solution of the desired metal compound. For ionic metal compounds, a polar solvent is preferred, such as water, alcohols, dimethylsulfoxide, sulfones, acetonitrile, acetone, etc.; and for neutral metal compounds a non-polar solvent is preferred, such as a hydrocarbon, chlorinated hydrocarbon, ether, etc. The metal compound is reduced on contact with the reducing agent, and zero-valent metal is deposited at or near the site of the reducing agent. Thereafter the resin particles are suitably washed and dried.

It is found that with a reducing agent like hydrazine, shell type deposition of metal on the resin particles or beads usually takes place when the hydrazine contact time is short, the temperature is room temperature, and a nonpolar solvent like chloroform, benzene, or ether is used to dissolve the hydrazine. Deposition in depth is usually obtained by using a long hydrazine contact time, a higher temperature going up to refluxing, and an ionizing solvent like water or an alcohol. These conditions and results generally apply to other reducing agents besides hydrazine, including substituted hydrazines, formates, and non-salt agents, i.e. those which are neutral with respect to charge.

Not only may the degree of dispersion of metal particles in the resin be controlled, but also the amount of metal, which may range from 0.01 or 0.1% to 1, 5, 10% or more, and even up to 50% or more, weight basis. Of particular significance from an economic view is the fact that there is no waste of metal during the metal deposition step, metal deposits only on or in the resin and not in the exterior solution.

The catalyst materials are suitable for use in reactions generally catalyzed by metal catalysts, preferbly in reactions where lower temperatures prevail, say up to 200 or 250° C. and preferably too in liquid phase reactions. They are particularly useful in hydrogenation reactions, as illustrated in Example 2, involving compounds having carbon-to-carbon unsaturation, as in the conversion of acetylenes, olefins, and diolefins, using catalyst materials containing platinum, palladium, ruthenium, rhodium, cobalt, and other metals.

Other catalytic reactions in which the catalysts are of value include decarbonylations, and deuterium-hydrogen exchange reactions such as exchange between deuterium gas and water to produce heavy water or an exchange between deuterium gas and aromatic hydrocarbons. Other reactions include the oxidation of hydrocarbons; for example, ethylene may be oxidized in solution in a polar solvent to give useful products; thus, with an aqueous solvent, the product is acetaldehyde; with methanol as solvent, the product is vinyl methyl ether; and with acetic acid as solvent, the product is vinyl acetate. Hydrocarbons and other compounds may be dehydrogenated. Carbon monoxide may be oxidized with oxygen in a CO-removal reaction. The catalysts are further useful in fuel cell electrodes to catalyze the oxidation of various fuels, including hydrocarbons; and they are suitable in other electrochemical oxidations and in reductions.

With some catalyst materials, prepared as described, the functional groups, such as sulfonic acid or trimethylbenzylammonium hydroxide of the resins may be regenerated by appropriate treatment. For example, in the case of Amberlyst-15, a cation exchange resin comprising a styrene-divinylbenzene copolymer containing sulfonic acid groups, the sulfonic acid groups may be regenerated, after the step of metal deposition, by treatment of the catalyst with an acid such as hydrochloric acid; the regenerated material contains free sulfonic acid groups and also has metal particles dispersed in and on the resin; it is useful as a dual functional catalyst, i.e. one containing two types of sites, acid sites and metal sites, and is able to catalyze organic polystep reactions. In such reactions, as described in our copending application Ser. No. 672,008, filed concurrently herewith, entitled "Catalytic Polystep Reactions," one type of site catalyzes a reaction step different from that catalyzed by another type of site. Depending on the ion exchange resin, acid or basic sites may be present, together with the metal sites. Thus, with a resin like Amberlyst A–27, comprising a styrene-divinylbenzene copolymer containing trimethylbenzylammonium groups, the regenerated material would have basic sites as well as metal sites. It should be understood that the choice of regenerating reagent is determined by the metal which is deposited within the resin as well as functional groups of the resin which are to be regenerated. For example, a sulfonic acid resin, in a non-acid form, containing deposited iron should be regenerated by dilute solutions of sulfuric acid rather than dilute hydrochloric acid as the latter would tend to remove some of the metallic iron.

Regeneration may not be necessary in instances where the resin has been exchanged to less than its capacity by reducing agents and metal ions as the final product would still have active acidic or basic groups.

Although low temperature liquid phase reactions are preferred, it will be appreciated that many low temperature reactions involve gaseous reactants and may be carried out in the gas phase, and the invention is applicable to these reactions. In some reactions, both liquid and gaseous reactants take part and are suitably catalyzed by the present catalysts. In all reactions, ease of catalyst separation by conventional operations of filtration, decantation, or centrifugation is a characteristic, whether the products and/or reactants are liquid or gaseous. The reactions may be carried out in conventional fixed bed flow reactors, or continuously stirred flow reactors, or in batch reactors.

Other useful catalyst materials, comprising modifications of those described, may be made by first treating the starting ion exchange resin with an appropriate reagent to introduce thereto one or more additional functional groups, such as amine, phosphine, arsine, stibine, sulfide, and the like. Or in place of the ion exchange resins, organic polymers may be used that contain the last-mentioned functional groups.

The invention may be illustrated by the following examples.

EXAMPLE 1

About 23 g. Amberlyst-15 (a cation exchange resin comprising a styrene-divinylbenzene copolymer containing sulfonic acid functional groups) was suspended in 250 ml. absolute ethanol, the suspension stirred, and 2 ml. of 64% aqueous hydrazine added. Stirring was continued for 10 minutes at room temperature, after which time the exterior solution still contained some hydrazine. The solids were then separated by filtration and washed well with ethanol; they comprised resin containing chemically bound hydrazine. They were suspended in 150 ml. absolute ethanol, the suspension stirred, and to it were added 200 ml. of a solution of 1.0 g. bis-(benzonitrile)-dichloropalladium (II) dissolved in absolute ethanol. The mixture was refluxed for 1 hour, during which time the solution became colorless while the resin blackened owing to the deposition of palladium metal. The solids were filtered, washed consecutively with ethanol, water, 6 N HCl solution, 2 N HCl solution, water, ethanol, and ether, and then dried in an oven at 110° C. The resulting catalyst beads, when cut in half, were observed to have palladium metal incorporated as a thin shell on the exterior boundary of the beads. Chemical analysis showed 3% palladium to be present, and 4.25 milliequivalents of sulfonic acid groups per gram of resin.

EXAMPLE 2

The catalyst of Example 1 was used for catalyzing the hydrogenation of 1-hexyne. About 200 mg. of the catalyst were finely ground and suspended in 25 ml. methylcyclohexane solvent. While the mixture was stirred, hydrogen at 1 atmosphere was introduced and 5 ml. of 1-hexyne was injected into the mixture. Hydrogen consumption was observed, and the mixture analyzed periodically by vapor phase chromatography. After 20 minutes of reaction, analysis showed no 1-hexyne present, 95% 1-hexene, and 5% n-hexane. After 60 minutes, there were present 50% 1-hexene, 20% 2- and 3-hexenes, and 30% n-hexane. Thus, the catalyst promoted hydrogenation of 1-hexyne and 1-hexene and isomerization of 1-hexene.

In contrast to such action, a conventional palladium on charcoal catalyst affords faster hydrogenation of 1-hexene to hexane than hydrogenation of 1-hexyne to 1-hexene. This makes isolation of the olefin difficult. The catalyst used herein promotes hydrogenation of 1-hexene to hexane at a much slower rate than it promotes the hydrogenation of 1-hexyne to 1-hexene. It is thus more selective and allows easier isolation of the olefin.

The Periodic Table classifications as used herein are based on the arrangement distributed by E. H. Sargent & Co. and further identified by the legend "Copyright 1962 Dyna-Slide Co."

It will be understood that the invention is capable of obvious variations without departing from its scope.

In the light of the foregoing description, the following is claimed:

1. The method which comprises contacting an ion exchange resin with a reducing agent to fix said reducing agent in said resin, then contacting said resin with a soluble metal compound, the metal of which is selected from Groups VIII, I–B, II–B, III–B, IV–B, V–B, VI–B, and VII–B of the Periodic Table at a temperature sufficiently high to reduce said metal of said metal compound to zero-valent metal, thereby reducing said metal of said metal compound to zero-valent metal in situ in said resin on contact of said compound with said reducing agent and depositing said zero-valent metal in said resin, and recovering as product said resin containing said zero-valent metal.

2. Method of claim 1 wherein said metal is a platinum series metal.

3. Method of claim 1 wherein said resin is an anion exchange resin.

4. Method of claim 1 wherein said resin is a cation exchange resin.

References Cited

UNITED STATES PATENTS

| 2,861,045 | 11/1958 | Langer | 252—430 |
| 3,417,066 | 12/1968 | Corte et al. | 260—96 |
| 3,442,924 | 5/1969 | Imura et al. | 252—431X |
| 3,442,954 | 5/1969 | Crocker et al. | 252—431X |

PATRICK P. GARVIN, Primary Examiner

U.S. Cl. X.R.

260—497, 604, 614, 683.3, 683.9